United States Patent [19]

Szabo et al.

[11] Patent Number: 5,067,732
[45] Date of Patent: Nov. 26, 1991

[54] SEAL ASSEMBLY

[75] Inventors: Steve B. Szabo, Washington; Daniel G. Chien, Royal Oak; Bruce V. Cobb, Livonia, all of MI.

[73] Assignee: Rockwell International Corporation, Pittsburgh, Pa.

[21] Appl. No.: 509,125

[22] Filed: Apr. 16, 1990

[51] Int. Cl.⁵ .................. F16J 15/32; F16J 15/46; F16C 33/78
[52] U.S. Cl. .......................... 277/11; 277/75; 277/152; 277/153; 384/479; 384/484; 384/485
[58] Field of Search ............... 277/35, 37, 48, 47, 277/49, 50, 51, 9, 11, 152, 153, 71, 75; 384/484, 485, 486, 479, 477

[56] References Cited

U.S. PATENT DOCUMENTS

| | | | |
|---|---|---|---|
| 2,948,554 | 8/1960 | Mahand | 384/479 |
| 3,869,131 | 3/1975 | Derner | 277/71 X |
| 3,871,666 | 3/1975 | Franz et al. | 277/71 X |
| 3,918,724 | 11/1975 | Alley | 277/9 |
| 4,071,076 | 1/1978 | Sakaki | 277/74 X |
| 4,185,838 | 1/1980 | Danner | 277/152 X |
| 4,258,927 | 3/1981 | Cather | 277/152 |
| 4,277,114 | 7/1981 | Lindegger | |
| 4,345,770 | 8/1982 | Seeh | 277/152 X |
| 4,440,401 | 4/1984 | Olschewski et al. | 277/152 X |
| 4,504,067 | 3/1985 | Cather, Jr. | 277/153 |
| 4,516,783 | 5/1985 | Mitsue et al. | 384/485 X |
| 4,552,367 | 11/1985 | Fedorovich et al. | 277/153 X |
| 4,669,895 | 6/1987 | Colanzi et al. | 384/486 X |
| 4,742,974 | 5/1988 | Furomoto | 277/152 X |
| 4,770,425 | 9/1988 | Colanzi et al. | 277/153 |
| 5,022,659 | 6/1991 | Otto | 277/152 X |

Primary Examiner—Allan N. Shoap
Attorney, Agent, or Firm—Charles E. Neff

[57] ABSTRACT

A seal assembly having first and second annular seal elements each having a generally axially extending base and an annular radial lip. Each of the bases includes a wear surface portion, a central portion and an end portion. Each of the annular radial lips extend from a respective end portion. Each of the central portions include at least one bore therethrough. The first and second seal elements are mounted on respective members and are arranged such that the wear surface portion of each seal element provides a wearing surface for the radial lip portion of the other seal element. Furthermore, when assembled, the seal assembly forms a fluid tight annular cavity between this first and second annular seal elements and the bores permit the passage of a fluid medium into and out of the annular cavity.

10 Claims, 2 Drawing Sheets

SEAL ASSEMBLY

BACKGROUND OF THE INVENTION

This invention pertains to the art of seals and more specifically to a two piece radial lip type seal arrangement used between two members which rotate relative to each other and which permits the passage of a fluid medium therethrough.

Two-element lip-type seal arrangements for use between two relatively rotatable members are known in the prior art as represented by U.S. Pat. No. 4,185,838. Seal arrangements of this type are used to prevent the entrance of contaminants into an area located between the two relatively rotatable members. The use of a two-element seal arrangement is highly advantageous since each element may be individually replaced if damaged. Unfortunately, the configuration of the seal arrangement in the above mentioned patent has a complex shape thereby reducing the allowable tolerances during manufacturing of these seal elements. The seal arrangement in the above mentioned patent does not permit the passage of air therethrough and due to its complex shape, the arrangement cannot be readily modified to perform this function.

The seals in U.S. Pat. Nos. 4,071,076 and 4,440,401 are provided with holes therethrough. In the '076 patent, the holes are provided in the seal in order to allow air to pass therethrough. This air, however, is used to provide a cooling effect. In the '401 patent, the holes are provided through the seals for lubrication purposes.

There exists a need for a seal arrangement which can be utilized between two relatively rotatable members, which is composed of two seal elements which may be individually replaced if damaged, and will permit the flow of a fluid medium between the relatively rotatable members through the seal assembly. Such a seal arrangement can be utilized in various arts, for example in combination with a tire inflation system as disclosed in U.S. Pat. No. 4,498,709.

It is therefore the object of the present invention to provide a seal arrangement capable of transmitting a pressurized fluid medium from a passage in one member, through the seal, into a passage of another member which rotates relative to the first member. The seal arrangement must prevent the leakage of the pressurized fluid medium through the seals, provide a seal which prevents the ingress of contaminants into the sealed area, and minimize the drag between the two relatively rotatable members. It is a further object of the present invention to provide a seal arrangement which may be readilly serviceable, will provide for an easy assembly and which will be reliable.

BRIEF SUMMARY OF THE INVENTION

The present invention provides a seal arrangement for use between two relatively rotatable members. More particularly, the seal arrangement is adapted for use between a stationary member and a rotating member which is rotatably supported by the stationary member and wherein the stationary member has a fluid passage which cooperates with a fluid passage in the rotating member.

As contemplated by the present invention, the seal assembly comprises first and second anular seal elements each having a generally axially extending base and an annular radial lip. Each of the seal elements are press fit or fixed to a respective one of the stationary or rotating members. The base of each seal element includes a wear surface portion, a central position and an end portion. Each of the annular radial lips extends, from its respective end portion, generally away from the base in a radial direction and generally inward towards the central portion in the axial direction.

Each of the central portions includes at least one bore therethrough aligned with their respective passages in the stationary and rotating members. The first and second seal elements are arranged such that the wear surface portion of each seal element provides a wearing surface for the radial lip portion of the other seal element. When assembled, the seal assembly forms a fluid tight annular cavity between the seal elements and the bores permit the passage of a fluid medium into and out of the annular cavity.

In order to minimize the drag between the two relatively rotatable members, a polytetrafluoroethylene (Teflon) bearing strip is bonded to the annular radial lip of each seal element. Each strip engages the wear surface portion of the other seal element and provides a low friction interface thereby reducing drag.

In circumstances in which the rotating member is axially mounted upon the housing, in order to assist in the ease of assembly, each of the seal elements is provided with a chamfered or beveled portion adjacent its respective wear surface portion. These chamfered or beveled portions serve as guides for the annular radial lip of the other seal element during assembly of the rotating member on the stationary member.

These and other aspects of the present invention will become more readily apparent by reference to the following detailed description of a preferred embodiment shown in the drawings.

DESCRIPTION OF THE PREFERRED EMBODIMENT

Figure 1:
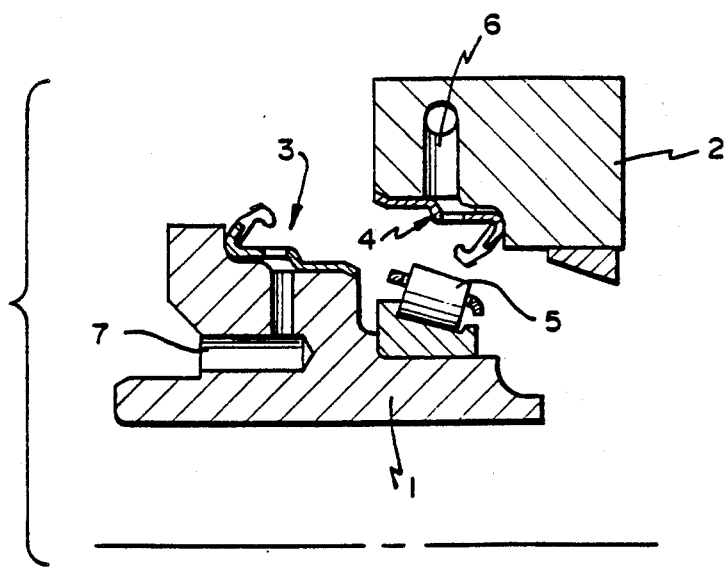
FIG. 1 is a cross sectional view showing the seal elements of the invention respectively mounted upon a rotating member and stationary member prior to mounting of the rotating member upon the stationary member.

As exemplified in the preferred embodiment, the seal assembly of the invention, composed of a first annular seal element 3 and second annular seal element 4, is located between a rotating member 1 and stationary member or housing 2. The stationary member 2 rotatably supports the rotating member 1 by means of bearings, one of which is indicated at 5.

More specifically, the first annular seal element 3 is pressfit, i.e. forced on with a material interference, onto the rotating member 1. The second annular seal element 4 is pressfit into the stationary member housing 2. The housing 2 includes a fluid passage 6 therethrough which is arranged to be in fluid communication with a passage 7 located in the rotating member 1. The seal assembly is arranged to permit the flow of a fluid medium from passage 6, through the seal assembly, and into passage 7 or vice versa as will be explained more fully below.

The elements of the seal assembly will now be explained in detail with reference to FIG. 4. The first annular seal element 3 is composed of an annular radial lip 13 and generally axially extending base including a wear surface portion 10, a central portion 11 and an end portion 12. The annular radial lip 13 extends from the end portion 12 generally away from the base in a radial direction and generally inward toward the central portion 11 in an axial direction.

The central portion 11 includes at least one bore 16 therethrough which is in fluid communication with the fluid passage 7 formed in the rotating member 1. Various circumferentially spaced bores 16 may be provided in the seal element. In the preferred embodiment it has been found satisfactory to provide two circumferentially spaced bores located opposite each other. The exact function of these bores will be more fully explained below.

One end of the first seal element 3, adjacent wear surface portion 10, includes a chamfered or beveled portion 14. This chamfered portion serves as a guide for the annular radial lip of the other seal element during assembly of the rotating member on the stationary member as will be more fully described below.

Bonded to the annular radial lip 13 is a bearing strip 15. The bearing strip is preferably formed of polytetrafluoroethylene (Teflon). The bearing strip functions to provide a low friction interface between the seal elements during use as will be described more fully herein.

The second annular seal element 4 is similar to the first seal element and includes a base, having a wear surface portion 20, central portion 21 and an end portion 22, and an annular radial lip 23. Like the first annular seal element 3, the central portion 21 of second annular seal element 4 includes at least one bore 26 therethrough in fluid communication with passage 6. Again, numerous bores can be provided with two being deemed satisfactory. Furthermore, the base includes a chamfered or beveled portion 24 adjacent surface wear portion 20 and a portion of the annular radial lip 23 has a bearing strip 25 bonded thereto.

Figure 2:
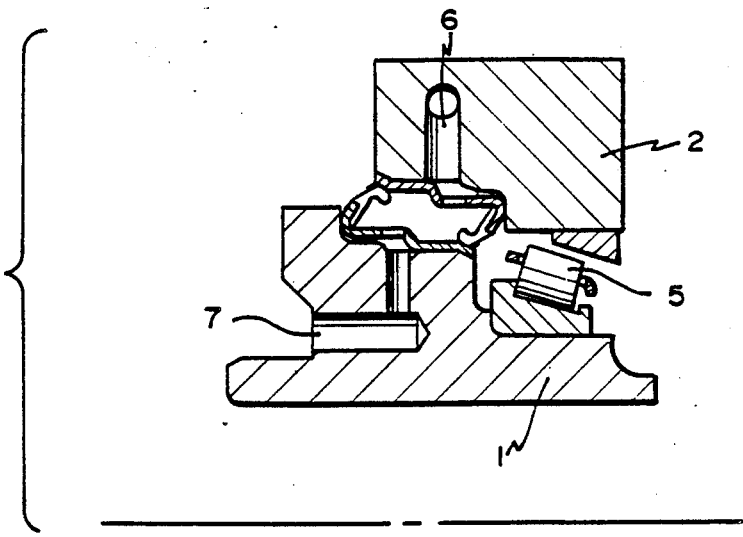
FIG. 2 shows the same cross section as FIG. 1 with the rotating member having been axially moved toward the stationary member and with each radial lip coming into contact with the chamfered or beveled portion of the other seal element.
Figure 3:
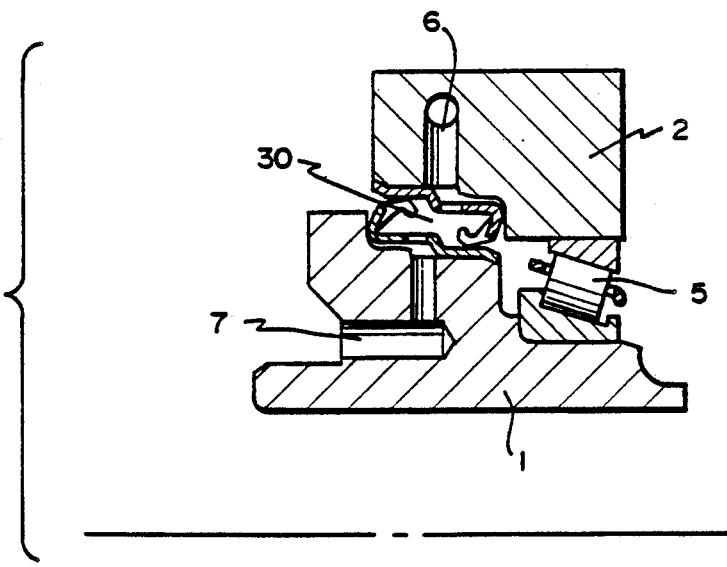
FIG. 3 shows the same cross section wherein the rotating member has been axially moved to its final position and wherein the radial lip of each seal element now engages a wear surface portion of the other seal element.

Reference now will be made to FIGS. 1-3 which show various stages of the mounting of rotating member 1 onto stationary member 2. In FIG. 1, the first and second annular seal elements have been press fit unto the rotating member 1 and the stationary member 2 respectively. The first and second annular radial lips 13, 23 are in a rest position in which they are flexed outward in a radial direction away from their respective bases.

In the preferred embodiment, the rotating member 1 is axially moved in order to be mounted upon the stationary member 2. In FIG. 2, the rotating member 1 has been moved toward the stationary member 2 to the point where the first annular radial lip 13 engages the chamfered portion 24 of the second annular seal element 4 and the second annular radial lip 23 is in engagement with the chamfered portion 14 of the first annular seal element 3. During further movement of the rotating member 1 in the axial direction, the chamfered portions 14 and 24 serve as guides for their respective annular radial lips 23 and 13.

Due to the presence of the chamfered portions 14 and 24, the radial lips 13 and 23 never come into contact with an edge of the other seal element. This prevents the bearing strips and the annular radial lips themselves from being nicked or deformed in any manner during assembling of the rotating member 1 on the stationary member 2.

Further movement of the rotating member 1 in the axial direction, approximately 0.125 inches (0.318 cm.) in the preferred embodiment, locates the seals in their respective final positions as shown in FIG. 3. In their final positions, the bearing strip 15 on the first seal element 3 engages wear surface portion 20 on second seal element 4. In addition, the bearing strip 25 of second annular seal element 2 engages the wear surface portion 10 of the first annular seal element 3. Since the bearing strips are made of polytetrafluoroethylene, low friction interfaces exist between the seal elements 3 and 4 and therefore between the rotating element 1 and the stationary member 2. The bearing strips have been found to provide a low resistance to rolling motion, even in the absence of a lubricant.

Figure 4:
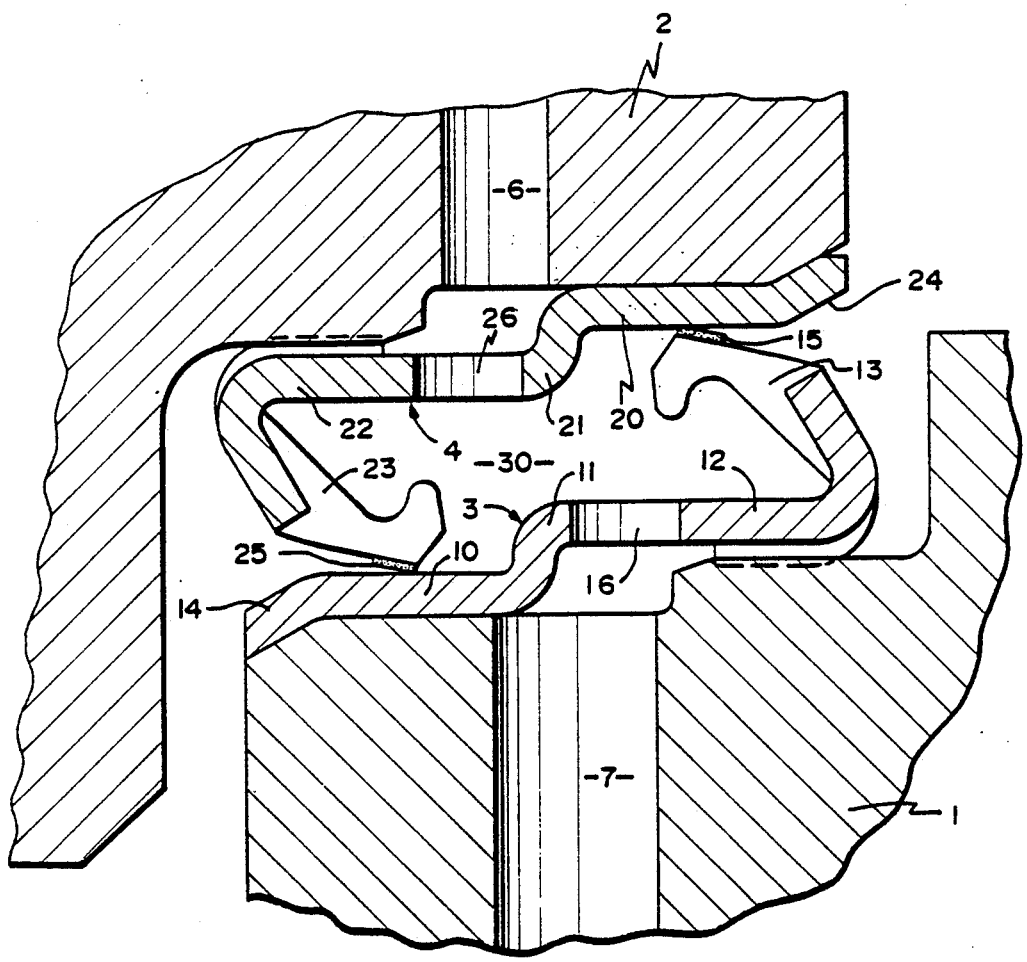
FIG. 4 shows an enlarged, mirror image of the seal assembly in the cross section shown in FIG. 3.

When the first and the second annular seal elements are in their final positions as clearly shown in FIGS. 3 and 4, an annular cavity 30 is formed therebetween. When the seal assembly is in its final position, a fluid medium, air in the preferred embodiment, is permitted to flow from the passage 6 in stationary member 2, through bores 26 in the second annular seal element 4, into the annular cavity 30. The fluid medium can then flow from the annular cavity 30 through bores 16 in the first annular seal element 3 into passage 7 in the rotating member 1. Fluid flow is likewise permitted in the reverse direction.

In order to provide for a fluid tight seal, the annular radial lip 13 of the first annular seal element 3 is of an expansion radial lip design. The second annular seal element 4 is larger than the first annular seal element 3 and the radial lip 23 of second annular seal element 4 is of a compression radial lip design. During assembly, as clearly shown in FIGS. 2 and 3, the radial lips 13 and 23 are deflected radially inward towards the base of their respective seal elements. When the seal assembly is in its final position, the annular radial lips 13 and 23 are spring biased radially outward. Annular radial lip 13 uses an expansion spring to seal against the wear surface portion 20 of the second annular seal element 4 mounted to stationary member 2. The second annular radial lip 23 uses a compression type spring that seals on the wear surface portion 10 of first annular seal element 3 on the rotating member 1. This mechanical spring force provides a positive seal to prevent contamination into annular cavity 30 to prevent leakage of the fluid medium out of annular cavity 30.

In addition to the mechanical spring force developed by the deflection of the annular radial lips during assembly, the force of air pressure within annular cavity 30 also functions to positively seal each radial lip against its respective wear surface portion.

In addition to the advantages previously described and those which are readily apparent to one of ordinary skill in art, it can be seen that the seal assembly disclosed herein has enhanced serviceability since a single lip can be replaced if damaged and provides integral wearing surfaces for both seals without extra parts. In addition, any radial loads that may develop during spinning of the rotating member 1 about the stationary member 2 will be shared by both of the annular radial lips at all times.

This will minimize the chances of any individual deformation of the bearing strips. Furthermore, as clearly evident in the drawings, the bores 16 and 26 are staggered. This staggered relationship in the seals elements allows for a reduction in seal width.

Although disclosed with respect to a particular embodiment, it can readily be seen that various changes and/or modifications may be made without departing from the spirit or scope of the present invention. In particular, the annular seal elements may be used in any environment in which a positive air tight seal is required between two members. Further, the seal element may be secured to their respective members by various other methods including adhesive bonding and bearing strips may be formed integral with the annular radial lips or composed of other known low friction materials. In general, any changes and/or modifications may be made without departing from the spirit or scope of the present invention as defined by the following claims.

We claim:

1. A seal assembly comprising first and second annular seal elements each having a generally axially extending base and an annular radial lip, each of said bases including a wear surface portion, a central portion and an end portion, each of said annular radial lips extending, from a respective base end portion, generally away from said base in a radial direction and generally inward toward said central portion in an axial direction, each of said central portions including at least one bore therethrough, said first and second seal elements being arranged such that the wear surface portion of each seal element provides a wearing surface for the radial lip portion of the other seal element whereby when assembled, the seal assembly forms a fluid tight annular cavity except for the bores between the seal elements and the bores permit the passage of a fluid medium into and out of the annular cavity.

2. A seal assembly as claimed in claim 1 wherein the first and the second seal elements are respectively mounted on two relatively rotatable members and a bearing strip is bonded to the annular radial lip of each seal element, each bearing strip engaging the wear surface portion of the other seal element to provide a sealing and low friction interface between the seal elements.

3. A sealing assembly as claimed in claim 2 wherein each bearing strip is formed of polytetrafluoroethylene.

4. A seal assembly as claimed in claim 1 wherein the first seal element is mounted to a rotating member, the second seal element is mounted to a stationary member which rotatably supports the rotating member, said rotating member is assembled on the stationary member by axial movement of said rotating member and the first and the second seal elements are provided with chamfered portions, adjacent the wear surface portions, which serve as guides for the annular radial lip of the other seal element during assembling of the rotating member on the stationary member.

5. A seal assembly as claimed in claim 4 wherein the rotating member and the stationary member are provided with fluid passages therein and the first and the second seal elements are arranged such that a fluid medium can pass between the fluid passages through the seal assembly, by means of the bores, in a fluid tight manner.

6. A seal assembly as claimed in claim 4 wherein the second seal element is larger than the first seal element.

7. A seal assembly as claimed in claim 6 wherein the first seal element is of an expansion radial lip design and the second seal element is of a compression radial lip design.

8. A seal assembly as claimed in claim 1 wherein the second seal element is larger than the first seal element.

9. A seal assembly as claimed in claim 8 wherein the first seal element is of an expansion radial lip design and the second seal element is of a compression radial lip design.

10. A seal assembly as claimed in claim 1 wherein the first seal element is of an expansion radial lip design and the second seal element is of a compression radial lip design.

* * * * *